United States Patent
Matthews et al.

(10) Patent No.: US 8,496,882 B2
(45) Date of Patent: Jul. 30, 2013

(54) CATALYST FEED SYSTEMS AND METHODS FOR USING THE SAME

(75) Inventors: William A. Matthews, Victoria, TX (US); Michael I. Hurdle, Rosenberg, TX (US); Gerardo Corona, Pearland, TX (US); Dung P. Le, Sugar Land, TX (US); Semra Gercek, Houston, TX (US); George W. Schwarz, Jr., Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/466,481

(22) Filed: May 8, 2012

(65) Prior Publication Data

US 2012/0219463 A1 Aug. 30, 2012

Related U.S. Application Data

(62) Division of application No. 12/811,482, filed as application No. PCT/US2008/013730 on Dec. 15, 2008, now Pat. No. 8,206,654.

(60) Provisional application No. 61/010,238, filed on Jan. 7, 2008.

(51) Int. Cl.
*B01J 4/00* (2006.01)

(52) U.S. Cl.
USPC .......................................... 422/138; 422/131

(58) Field of Classification Search
USPC .................................................. 422/131, 138
See application file for complete search history.

(56) References Cited

U.S. PATENT DOCUMENTS

| | | | |
|---|---|---|---|
| 4,162,894 | A | 7/1979 | Tribble |
| 4,579,836 | A | 4/1986 | Arzoumanidis et al. |
| 4,687,381 | A | 8/1987 | Dumain et al. |
| 4,690,804 | A | 9/1987 | Rohlfing |
| 5,332,706 | A | 7/1994 | Nowlin et al. |
| 5,427,991 | A | 6/1995 | Turner |
| 5,433,924 | A | 7/1995 | Sagar et al. |
| 5,473,028 | A | 12/1995 | Nowlin et al. |
| 5,492,975 | A | 2/1996 | Peifer et al. |
| 5,643,847 | A | 7/1997 | Walzer, Jr. |
| 5,994,482 | A | 11/1999 | Georgellis et al. |
| 6,300,436 | B1 | 10/2001 | Agapiou et al. |
| 6,306,984 | B1 | 10/2001 | Agapiou et al. |
| 6,680,276 | B2 | 1/2004 | Kuo et al. |
| 8,206,654 | B2 | 6/2012 | Matthews et al. |
| 2001/0041219 | A1 | 11/2001 | Durand et al. |
| 2002/0161141 | A1 | 10/2002 | Mawson et al. |
| 2003/0027956 | A1 | 2/2003 | Agapiou et al. |
| 2007/0027027 | A1 | 2/2007 | Agapiou et al. |

FOREIGN PATENT DOCUMENTS

| | | |
|---|---|---|
| EP | 453116 B1 | 10/1991 |
| GB | 896786 | 5/1962 |
| WO | WO 96/11961 | 4/1996 |

*Primary Examiner* — Caixia Lu
(74) *Attorney, Agent, or Firm* — Jennifer A. Schmidt

(57) ABSTRACT

Catalyst feed systems and processes utilizing such systems are described herein. Some embodiments disclosed herein relate to a process for improving the flowability of catalyst in a catalyst feed system, including providing a catalyst feed vessel with at least one heat exchange system for maintaining the catalyst system temperature below a critical flow temperature. Also disclosed is a catalyst feed system for the polymerization of olefins including a catalyst feed vessel; and a heat exchange system for maintaining a temperature of a catalyst within the catalyst feed vessel. Additionally disclosed is a process for polymerization of olefins including maintaining a supported catalyst in a catalyst feed vessel below a critical flow temperature of the catalyst; feeding the catalyst to a polymerization reactor; and contacting the catalyst with an olefin to form a polyolefin.

7 Claims, 2 Drawing Sheets

CATALYST FEED SYSTEMS AND METHODS FOR USING THE SAME

CROSS REFERENCE TO RELATED APPLICATIONS

This application is a divisional of U.S. patent application Ser. No. 12/811,482, filed Sep. 2, 2010, which is a National Stage Application under 35 U.S.C. §371 of International Application No. PCT/US2008/013730, filed Dec. 15, 2008, which claimed the benefit of U.S. Provisional Application Ser. No. 61/010,238, filed Jan. 7, 2008, the disclosures of which are incorporated by reference in their entirety.

FIELD OF THE INVENTION

Embodiments disclosed herein relate generally to catalyst feed systems. More particularly, embodiments disclosed herein relate to catalyst feed systems for polymerization processes. Even more particularly, embodiments disclosed herein relate to improved flowability of catalyst systems in catalyst feed systems and catalyst storage vessels for olefin polymerization processes.

BACKGROUND

Advances in polymerization and catalysis have resulted in the capability to produce a plethora of new polymers having improved physical and chemical properties. These new polymers have proved useful in producing a wide variety of superior products with new applications. With the development of new catalysts, the variety of polymerization types (solution, slurry, high pressure, or gas phase) available for producing a particular polymer has also been greatly expanded. Advances in polymerization technology have thus resulted in more efficient and highly productive processes which have proved economically advantageous. Illustrative of these advances is the development of technology utilizing supported catalyst systems for the heterogeneous catalysis of olefin polymerizations. These heterogeneous catalyst systems provide a surface area for catalysis, and are typically prepared by deposition of reactive catalytic moieties on a particulate support, usually an inorganic oxide. There are a variety of different methods described in the art for supporting catalytic moieties on supports for use in slurry or gas phase polymerization processes.

For example, heterogeneous catalysts, such as supported Ziegler-Natta or chromium-based catalysts, have had significant impact on the polyolefin industry. Supported Ziegler-Natta catalysts afford high activity and high stereo-regular content in olefin polymerization while supported chromium-based catalyst systems typically produce polyolefins with a narrow molecular weight distribution and high molecular weight. Coupled with advantages over homogeneous catalysts, such as increased thermal stability, ease of separation, and no solvent limitations, heterogeneous catalyst systems may be industrially advantageous. Such catalyst systems opened scientific floodgates, leading to an explosion of new chemistry, new processes, and new products in the polyolefin industry.

However, as with the advent of any new technology, new challenges are presented with the heterogenization of catalyst systems. For example, heterogeneous catalyst systems are theoretically less efficient than their homogeneous counterparts because the polymerization reaction must necessarily take place on the surface of the catalyst. Any catalyst moiety not present at the surface may remain unused, whereas all the molecules in a homogeneous catalyst are theoretically available. Further, heterogeneous catalyst systems tend to be more sensitive to poisoning, such as by soft ligands and the oxygen content and humidity of air, than homogeneous catalysts. As such, heterogeneous catalyst systems are usually handled under highly inert, dry, and oxygen free atmospheres. Yet further, circulation of heterogeneous catalyst systems through the polymerization system poses unique problems. Whereas homogeneous catalysts are usually introduced as a solution in a wet feed, heterogeneous catalyst systems may be introduced as a dry feed. The use of a dry catalyst feed presents several advantages over a wet feed, such as ease of handling and conservation of solvent. Thus, the dry feed of a supported catalyst system may provide both economic and environmental advantages to a polyolefin manufacturer.

In a dry catalyst feed process, it is desirable that the heterogeneous catalyst system flow freely through catalyst feeders and feed lines. A number of catalyst feed systems for gas phase reactors are known to those skilled in the art. Well known systems include systems including a catalyst storage vessel connected to a feed chamber which is in turn connected to a gas phase reactor. The catalyst storage vessel, feed chamber, and gas phase reactor may be connected to each other by filling and emptying valves. Typically, a heterogeneous catalyst system is conveyed from the storage vessel through the catalyst feed system to the reactor by maintaining the reactor at a pressure lower than that in the catalyst feed system. Valves incorporated in such systems allow a given quantity of heterogeneous catalyst system to move from the storage vessel to a feed chamber or metering device and then to the reactor.

U.S. Pat. No. 4,162,894 describes a pressure equalized feed system incorporating a ball check feed valve and a downstream positive shut-off valve for controlling intermittent feed of heterogeneous catalyst system. U.S. Pat. No. 4,687,381 describes a feed system using a shut-off valve and metering device for periodic delivery of powdered heterogeneous catalyst system. These, and other conventional catalyst feed systems, however, may not overcome the problems caused by poor catalyst flow.

The flow properties of a heterogeneous catalyst system are dependent on a multitude of factors, such as the nature of the catalytic moiety and the nature of the support, among other factors. For example, heterogeneous catalyst systems, including a carboxylate metal salt in conjunction with a supported metallocene catalyst system such as described in U.S. Pat. Nos. 6,306,984 and 6,300,436 substantially improve process operability, but have sticky or statically inclined particulate flow. Pre-polymerized catalysts, such as described in U.S. Pat. No. 4,579,836, made by treating the catalyst with a small amount of monomer under polymerization conditions, may demonstrate improved catalyst particle strength and product characteristics, but may have a concomitant degradation in catalyst flow properties.

Heterogeneous catalyst systems with poor flow are more difficult to feed to a reactor, and may prevent the desired smooth and continuous introduction of catalyst into the reactor. Poorly flowing heterogeneous catalyst systems may also stick to walls of catalyst feed vessels, feeders, and feed lines, causing buildup and possible clogging of feed lines. Buildup of residual catalyst system in feed lines interferes with control of delivery, and ultimately process control. Further, poorly flowing heterogeneous catalyst systems may impair accurate delivery of the desired catalyst system amount to the polymerization reactor. This may result in poor polymerization efficiency and low production. Ineffective catalyst delivery, therefore, affects system performance, stability, and, ultimately, the polymer product.

The myriad of problems caused by poorly flowing catalyst systems significantly impairs process operability and efficiency, in some cases to the point of reactor shutdown. Where the buildup proceeds to the extent that feed lines are clogged, the polymerization system may have to be taken off line to clean the clogged lines. Frequent repair and/or replacement of system valves and clogged lines can prove time-consuming and expensive. Repair of clogged lines and valves results in reactor downtime, increased personnel hours, and replacement of parts, all of which add to the cost of the process, and may result in a significant economic loss to the polymer manufacturer.

Solutions to poorly flowing dry heterogeneous catalyst systems have been addressed by modifying the method of preparation of the catalyst system. For example, the catalyst system components may be combined in a particular order; the ratio of the various catalyst system components may be manipulated; the contact time and/or temperature when combining the components while forming a catalyst system may be varied; or additional compounds may be added to the catalyst system. Examples of these include: WO 96/11961 discusses an antistatic agent as a component of a supported catalyst system; U.S. Pat. Nos. 5,332,706 and 5,473,028 disclose incipient impregnation as a particular technique for forming a catalyst system; U.S. Pat. Nos. 5,427,991 and 5,643,847 describe the chemical bonding of non-coordinating anionic activators to supports; U.S. Pat. No. 5,492,975 discusses polymer bound metallocene catalyst systems; and U.S. Pat. No. 6,680,276 discusses a composition of a carboxylate metal salt in combination with a heated polymerization catalyst system to improve the catalyst system flow and operability of the catalyst system.

Other solutions have been directed towards the catalyst feed system. For example, U.S. Pat. No. 5,433,924 is directed towards using filters positioned to vent the fill chamber. The positioning of the filter provides a pressure differential to encourage poorly flowing catalyst system to flow through the feed lines, and provides a means for removing and recycling residual catalyst system. U.S. Pat. No. 4,690,804 describes the use of a ball check feed valve for the transfer of polymer coated catalyst system.

Some of the techniques discussed above for remedying poor catalyst system flow may affect catalyst system productivity, catalyst system activity, may not work for particular catalyst system types, may add significant cost to the catalyst system manufacture process, and may cause additional problems such as sheeting and fouling during the polymerization process. Accordingly, there exists a need for methods, processes, and systems to improve catalyst system flow.

SUMMARY

In one aspect, embodiments disclosed herein relate to a process for improving the flowability of catalyst in a catalyst feed system, including providing a catalyst feed vessel with at least one heat exchange system for maintaining catalyst system temperature below a critical flow temperature.

In another aspect, embodiments disclosed herein relate to a catalyst feed system for the polymerization of olefins including a catalyst feed vessel; and a heat exchange system for maintaining a temperature of a catalyst within the catalyst feed vessel.

In yet another aspect, a process for polymerization of olefins including maintaining a supported catalyst in a catalyst feed vessel below a critical flow temperature of the catalyst; feeding the catalyst to a polymerization reactor; and contacting the catalyst with an olefin to form a polyolefin.

DETAILED DESCRIPTION

Figure 1:
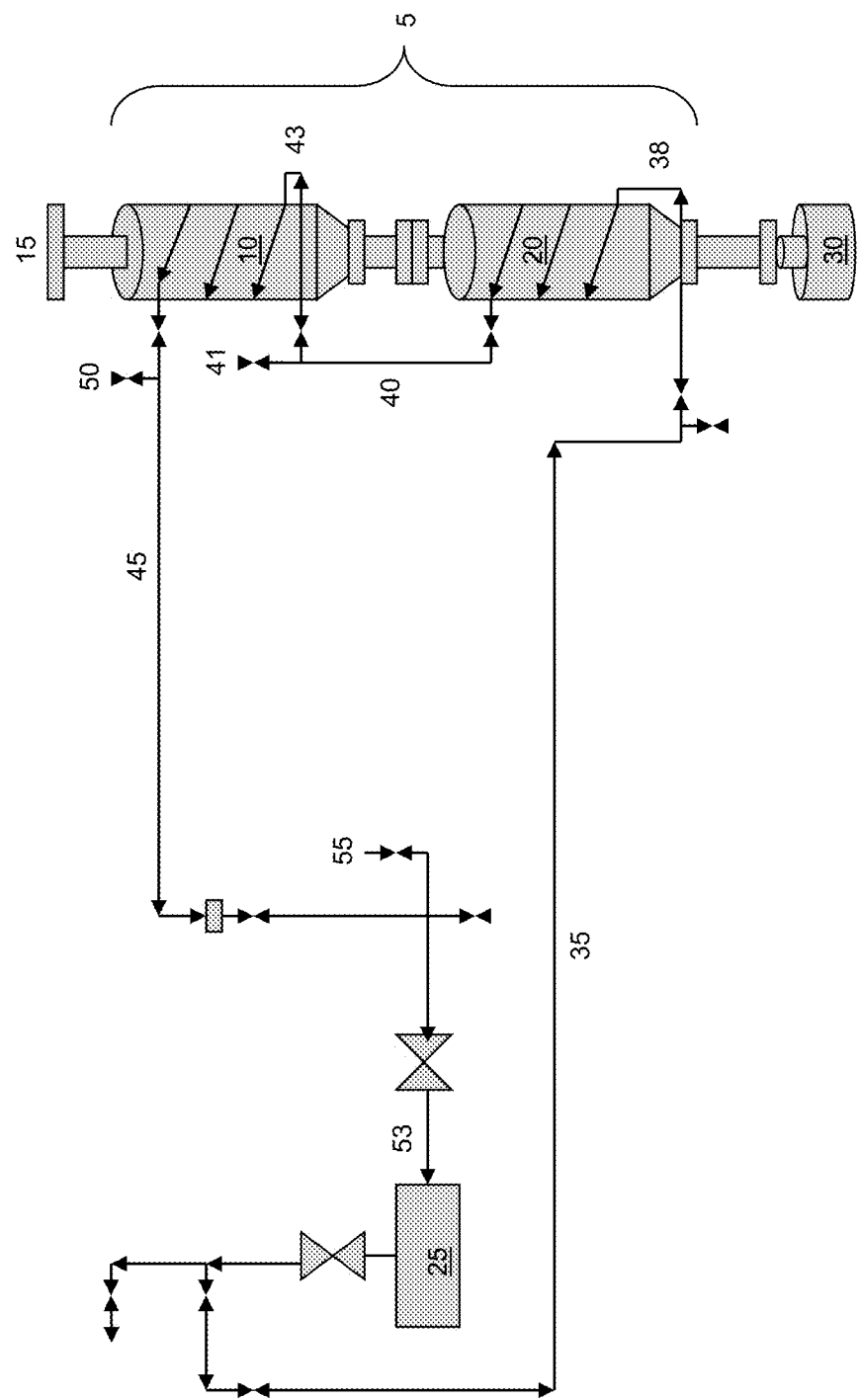
FIG. 1 is a cooled catalyst feed system, according to embodiments described herein.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

Generally, embodiments disclosed herein relate to the improvement of heterogeneous catalyst feed systems and flow of the catalyst system within the feed system. In one aspect, embodiments disclosed herein relate to a catalyst feed system for the polymerization of olefins including a catalyst feed vessel, a catalyst feeder for aliquoting the catalyst system, and a system for maintaining the catalyst feed vessel temperature. In yet another aspect, embodiments disclosed herein relate to a process for polymerization of olefins including cooling the catalyst shipping containers, cooling the catalyst transport system from the shipping containers to the catalyst feed system, and cooling the catalyst feed system.

As used hereafter, "flowability" refers to the ability of the heterogeneous catalyst system to flow. Good flowability refers to the ability of heterogeneous catalyst systems to flow freely and consistently. Non-flowing or poorly flowing catalyst systems have poor flowability. Heterogeneous catalyst systems can therefore range from free-flowing powders having good flowability to non-flowing powders having poor or no flowability. Flowability is a complex and multidimensional property, and may be affected by both material physical properties of the catalyst system and the equipment used for handling, storing, or processing the catalyst system. Factors that affect flowability may include particle size and homogeneity, nature of the catalytic moiety supported on the solid support, humidity, temperature, and static generated by the flow of the catalyst system over the interior walls of the catalyst feed system, among others.

Flowability may be assessed, for example, by monitoring the pressure differential across the catalyst pick-up block, using various instruments known to one of skill in the art, such as pressure gages, differential pressure gages, etc. The catalyst pick-up block fluidly connects the catalyst feed vessel to the catalyst feed line which goes to the polymerizations reactor. The pressure differential across the pick-up block measures the ease of transfer of the catalyst from the catalyst feed vessel to the catalyst feed line. If the catalyst system exhibits clumping or tackiness leading to poor flow, the uptake of the catalyst by the catalyst pick-up line may be affected. This may in turn be reflected in poor pressure differential across the catalyst pick-up block. Accordingly, a catalyst with good flowability is one which demonstrates acceptable pressure differential. Where very little or no pressure differential is observed, this is indicative of possible clogging and the catalyst is deemed to possess poor flowability.

As used hereafter, "aliquoting" refers to designating a portion, part, or sample of a chemical composition. For example, aliquoting of a catalyst system would refer to the designation of a portion, part, or sample of that catalyst system.

The inventors of embodiments of the present disclosure have found that the temperature of the catalyst feed system is a critical parameter to the flowability of some catalyst systems. At elevated temperatures, some catalyst systems have been observed to exhibit poor flowability, which may adversely affect catalyst system feed and reactor operations. For example, particular metallocene catalyst systems may exhibit poor flowability at or above a temperature of about 29° C. Elevated catalyst system temperatures may be encountered during handling, storage, and/or transport of the catalyst system, each of which may contribute or cause poor flowability of a catalyst system. Without being bound to theory, there are several possible causes, inclusive of ambient heat and heat of friction, for undesirable elevated temperatures encountered during the handling, storage, and/or transportation processes. Temperatures above which a catalyst system exhibits decreased or poor flowability will be referred to herein as the "critical flow temperature" of the catalyst system.

For example, in tropical climates, and during warmer times of the year, catalyst containers and feed systems may warm above critical flow temperatures due to ambient heat. Catalyst system temperatures may also be influenced by a multitude of factors other than ambient temperature, such as solar heat flux, especially under peak summer conditions; convective heat gain at wind velocities around the elevated structures of the storage, holding, feeding, or processing vessels; radiant heat gain from the reactor, flares, machinery, and other equipment at elevated temperatures; and conduction through insulation or pipe walls in contact with media at elevated temperatures. In some instances, the temperature of the catalyst storage vessels and/or feed system may rise to 40° C. or higher. Exposure of the catalyst system to these elevated temperatures may lead to clumping, increased static and poor flowability, which in turn may lead to clogging of feed vessels and feed lines, as discussed above.

Catalyst systems may also experience heat gain through loading and flow through the catalyst feed system. As the heterogeneous catalyst system flows through the catalyst feed vessel, valves, and feed lines, the particles may impact surfaces of the catalyst feed system as well as other catalyst system particles. The kinetic energy of the moving particles may be converted into heat of friction, which may contribute to increasing the temperature of the catalyst system within the catalyst feed system.

Ambient heat, alone or coupled with heat of friction, may cause elevated catalyst feed temperatures, often well above the critical flow temperature of many catalyst systems. Heterogeneous catalyst systems exposed to these elevated temperatures during feed processes and/or during storage may become sticky, clumped, or statically inclined.

Applicants have advantageously found that by maintaining the temperature of the catalyst feed system, or portions thereof, below the critical flow temperature of a catalyst system may improve the flowability of the catalyst system through the catalyst feed system. Applicants have also found that regulating the temperature of the catalyst system at all stages of handling, inclusive of storage and transportation, may improve catalyst system flowability. In various embodiments of this disclosure, improved flowability has been observed where the catalyst feed system, or portions thereof, is maintained, for example, below 29° C., below 27° C., below 25° C., below 15° C., and below 10° C.

The term "heterogeneous catalyst systems" typically refers to a catalyst which is present in a different phase from the reactants. In embodiments herein, heterogeneous catalyst system refers to solid or supported catalysts. Accordingly, the heterogeneous catalyst systems undergo particulate flow through the catalyst feed systems of the present disclosure. The heterogeneous catalyst systems of the present disclosure may include any of the kinds known to be used for polymerization or oligomerization. In some embodiments, the heterogeneous catalyst system may be of the types used in the polymerization or oligomerization of olefins. For example, the heterogeneous catalyst system may be a catalyst or a "catalyst system," as typically used in this type of polymerization.

The term "catalyst system" includes at least one "catalyst component" and at least one "activator" or "cocatalyst," and alternatively at least one other component, such as, for example, at least one "continuity additive." The catalyst system also includes other components, such as supports, and is not limited to the catalyst component and/or activator alone or in combination. The catalyst system may include any number of catalyst components in any combination, as well as any activator in any combination.

The term "catalyst component" includes any compound that, once appropriately activated, is capable of catalyzing the polymerization or oligomerization of olefins. In some embodiments, the catalyst component includes at least one Group 3 to Group 12 atom and optionally at least one leaving group bound thereto. As used herein, in reference to Periodic Table "Groups" of Elements, the "new" numbering scheme for the Periodic Table Groups is used as in the CRC Handbook of Chemistry and Physics (David R. Lide, ed., CRC Press, $81^{st}$ ed., 2000).

The catalyst or catalyst system may include Ziegler-Natta catalysts, chromium-based catalysts, metallocene catalysts and other single-site catalysts, Group 15-containing catalysts, and bimetallic catalysts. The catalyst or catalyst system may also include $AlCl_3$, cobalt, iron, palladium, chromium/chromium oxide or "Phillips" catalysts. Any catalyst or catalyst system may be used alone or in combination with the others. In one or more embodiments, a "mixed" catalyst system is preferred.

Illustrative non-metallocene Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those including Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports. Examples of conventional Ziegler-Natta catalysts are discussed in U.S. Pat. Nos. 4,115,639, 4,077,904, 4,482,687, 4,564,605, 4,721,763, 4,879,359 and 4,960,741. The conventional Ziegler-Natta catalysts that may be used include transition metal compounds from Groups 3 to 17, or Groups 4 to 12, or Groups 4 to 6 of the Periodic Table of Elements. These conventional Ziegler-Natta catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional Ziegler-Natta catalysts where M is titanium include $TiCl_4$, $TlBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \tfrac{1}{3}AlCl_3$ and $Ti(OC_{12}H_{25})Cl_3$.

Illustrative chromium-based catalysts include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Other catalysts useful in embodiments of the present disclosure may include Group 15-containing catalysts. The "Group 15-containing catalyst" may include Group 3 to Group 12 metal complexes, and Group 4 metals in a particular embodiment wherein the metal is 2 to 8 coordinate, 2 to 4 coordinate in a particular embodiment, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogen atoms. Representative Group 15-containing compounds are disclosed in, for example, WO 99/01460; EP A1 0 893 454; U.S. Pat. No. 5,318,935; U.S. Pat. No. 5,889,128; U.S. Pat. No. 6,333,389 B2; and U.S. Pat. No. 6,271,325 B1. In one embodiment, the Group 15-containing catalyst includes Group 4 imino-phenol complexes, Group 4 bis(amide) complexes, and Group 4 pyridyl-amide complexes that are active to any degree towards olefin polymerization.

Metallocenes are generally described throughout in, for example, 1 & 2 METALLOCENE-BASED POLYOLEFINS (John Scheirs & W. Kaminsky, eds., John Wiley & Sons, Ltd. 2000); G. G. Hlatky in 181 Coordination Chem. Rev. 243-296 (1999) and in particular, for use in the synthesis of polyethylene in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components." The metallocene catalyst component is supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members.

Catalysts or catalyst systems useful in embodiments of the present disclosure may contain "substituted" groups. As used herein, the term "substituted" means that the group described by that term possesses at least one moiety in place of one or more hydrogens in any position, the moieties selected from such groups as halogen radicals (for example, $C_l$, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof For example, the Cp ligand(s) may be selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof.

A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

Catalysts useful in embodiments of this disclosure may be "activated" by contact with an "activator" or "cocatalyst." The term "activator" may include any compound or combination of compounds, supported or unsupported, which can activate a catalyst compound (e.g., metallocenes), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

For example, Lewis acids may be used to activate the metallocenes described. Illustrative Lewis acids include, but are not limited to, alumoxane (e.g., methyl alumoxane or "MAO"), modified alumoxane (e.g., modified methyl alumoxane or "MMAO"), tetraisobutyldialuminoxane (e.g., "TIBAO"), and alkylaluminum compounds. Ionizing activators (neutral or ionic) such as tri (n-butyl)ammonium tetrakis (pentafluorophenyl)boron may be also be used. Further, a trisperfluorophenyl boron metalloid precursor may be used. Any of those activators/precursors can be used alone or in combination with the others. MAO and other aluminum-based activators are known in the art. Ionizing activators are known in the art and are described by, for example, Eugene You-Xian Chen & Tobin J. Marks, *Cocatalysts for Metal-Catalyzed Olefin Polymerization: Activators, Activation Processes, and Structure-Activity Relationships*, 100(4) CHEMICAL REVIEWS 1391-1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization*, 100(4) CHEMICAL REVIEWS 1347-1374 (2000).

A "continuity additive" may be added to the catalyst systems useful in this disclosure. Continuity additives may be added to the catalyst system to reduce sheeting or fouling in the reactor during polymerization. Suitable continuity additives for use in the present invention comprise one or more compounds selected from alkoxylated amines, carboxylic acid salts, polysulfones, polymeric polyamines, and sulfonic acids. For example, the continuity additive may comprise any of ethoxylated stearyl amine, aluminum stearate or aluminum oleate or mixtures thereof.

The above references are provided for reference of possible types of catalysts which may exhibit poor flowability above a critical flow temperature. Not all catalysts described in the above references exhibit poor flowability above a critical flow temperature; however, catalyst feed systems and processes described herein may be used to improve the flowability of the catalysts which do exhibit poor flowability above a critical flow temperature.

In some embodiments, it may be necessary to determine the critical flow temperature of a catalyst. For example, various catalyst systems may intermittently exhibit poor flowability, where temperatures above the critical flow temperature may be a contributing cause to the intermittent flow problems experienced. In such a case, experimentation may be used to determine the critical flow temperature of the catalyst, and catalyst feed systems as described herein may be used to maintain the catalyst below the critical feed temperature in a catalyst feed vessel and/or during feeding of the catalyst to a polymerization reactor.

In some embodiments, the catalysts may include heterogeneous Ziegler-Natta catalysts, Phillips catalysts, conventional chromium catalysts, Group 15-containing catalysts, and metallocene catalysts, or mixtures thereof. In selected embodiments, the catalyst may be XCAT™ EZ-100 Metallocene Catalyst or XCAT™ HP-100 Metallocene Catalyst, available from Univation Technologies, LLC, Houston, Tex. XCAT™ Metallocene Catalysts, for example, may have a critical flow temperature within the range of 27° C. to 30° C.

Catalysts useful in embodiments disclosed herein are supported on a catalyst support. In some embodiments, the catalysts are deposited onto conventional catalyst supports, for example, inorganic oxide materials. The inorganic oxide materials which may be used as a support in the catalyst systems of the present disclosure are porous materials having with variable surface area and particle size, for example, a surface area in the range of 50 to 1000 square meters per gram, and a particle size of 0.1 to 200 micrometers. In some embodiments, the particle size may be 1 to 50 micrometers. The inorganic oxides which may be used include silica, alumina, thoria, zirconia, aluminum phosphate and other comparable inorganic oxides, as well as mixtures of such oxides.

In some embodiments of the present disclosure, the catalyst may be deposited onto conventional catalyst supports. The term "support," as used herein, refers to any support material, a porous support material in one exemplary embodiment, including inorganic or organic support materials. The inorganic oxide materials which may be used as a support in the catalyst compositions of the present invention are porous materials having a high surface area, for example, a surface area in the range of 50 to 1000 $m^2$ per gram, and a particle size of 20 to 200 micrometers. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gels, glass beads, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

In some embodiment, desirable carriers may be inorganic oxides that include Group 2, 3, 4, 5, 13 and 14 oxides and chlorides, and more particularly, inorganic oxides and chlorides of Group 13 and 14 atoms. In other embodiments, support materials may include silica, alumina, silica-alumina, magnesium chloride, graphite, and mixtures thereof. In yet other embodiments, support materials may include magnesia, titania, zirconia, montmorillonite (as disclosed in EP 0511665B1, for example), phyllosilicate, and the like. Also, combinations of these support materials may be used, such as, for example, silica-chromium, silica-alumina, silica-titania, and the like. Additional support materials may include those porous acrylic polymers described in EP 0767184 B1.

In some embodiments, the support materials comprise silica, particularly amorphous silica, and most particularly high surface area amorphous silica. Such support materials are commercially available from a number of sources. Such sources include the Davison Chemical Division of W.R. Grace and Company which markets silica support materials under the trade names of Davison 952 or Davison 955, or Crosfield Limited which markets silica support materials under the trade name of Crosfield ES70. In some embodiments, the silica may be in the form of spherical particles, which may be obtained by a spray-drying process.

The silica supports may have a wide range of pore sizes and surface areas. In some embodiments, the support may have a pore volume of about 0.5 to about 6.0 $cm^3/g$ and a surface area of about 200 to about 600 $m^2/g$. In other embodiments, the support may have a pore volume of about 1.1 to about 1.8 $cm^3/g$ and a surface area of about 245 to about 375 $m^2/g$. In some other embodiments, the support may have a pore volume of about 2.4 to about 3.7 $cm^3/g$ and a surface area of about 410 to about 620 $m^2/g$. In yet other embodiments, the support may have a pore volume of about 0.9 to about 1.4 $cm^3/g$ and a surface area of about 390 to about 590 $m^2/g$.

The supports may be contacted with the catalytic moiety in any of the ways known to one of ordinary skill in the art. The deposition of a catalytic moiety onto the support surface is usually carried out between a support in a solid phase and the catalytic moieties in a liquid phase. The support and catalysts are contacted for a time sufficient to support the catalytic moieties onto the particulate support. The supported catalyst is then washed and dried, producing a solid particulate heterogeneous catalyst.

Following catalyst manufacture, heterogeneous catalysts are typically stored until needed. To maintain flowability of catalysts used in some embodiments disclosed herein, the catalyst may be stored in a conditioned storage space, for example. Applicants have advantageously found that storing the heterogeneous catalyst in a conditioned storage space where the temperature is regulated may improve flowability of the catalyst. The storage space should be maintained at a temperature below the critical flow temperature of the catalyst, and may be maintained at a temperature ranging from 1-25° C., from 5-21° C., or from 10-20° C., for example. The storage space may be conditioned or cooled by any means known to one of skill in the art. The catalyst may be stored in a conditioned storage space until needed, at which point the catalyst may be loaded into the catalyst feed system.

In some embodiments, the catalysts may not be stored, and may be directly transported from a catalyst preparation vessel to a catalyst feed vessel.

Applicants have advantageously found that maintaining the temperature of the catalyst feed vessel below the critical flow temperature of a catalyst may improve the flowability of the catalyst through the catalyst feed system. For example, a catalyst, either stored or transported, may be loaded into a catalyst feed vessel and maintained at a temperature below the critical flow temperature of the catalyst. In various embodiments, the catalyst feed vessel may be maintained at a temperature of 29° C. or less, 28° C. or less, 27° C. or less, 26° C. or less, 25° C. or less, 20° C. or less, or 15° C. or less Applicants have also found that regulating the temperature of the catalyst feed system, or portions thereof, below a critical flow temperature of a catalyst, may improve the catalyst flowability and decrease plugging and other issues related to flowability. For example, portions of the catalyst feed system that may be maintained below a critical flow temperature of a catalyst may include feed valves, piping, tubing, and other catalyst feed system components that may otherwise attain a temperature above a critical flow temperature of a catalyst, inclusive of all catalyst feed system components between the catalyst feed vessel and the polymerization reactor. In various embodiments of this disclosure, the catalyst feed system, or selected portions thereof, may be maintained at a temperature of 29° C. or less, 28° C. or less, 27° C. or less, 26° C. or less, 25° C. or less, 20° C. or less, or 15° C. or less.

In some embodiments, such as where only the catalyst feed vessel and/or select portions of the catalyst feed system are maintained at a temperature below a critical flow temperature of a catalyst, the temperature set point may be selected so as to account for heat gain via those portions that are not maintained at a temperature below a critical flow temperature of a catalyst. For example, where only the catalyst feed vessel is maintained at a decreased temperature, the temperature set point may be selected such that the catalyst, during transport from the catalyst feed vessel to the reactor, may remain below the critical flow temperature of the catalyst.

Embodiments of the catalyst feed systems of this disclosure may include major components such as shown in FIG. 1, including: a catalyst feed vessel 5, which includes at least a catalyst hold tank 10 and may include a catalyst feeder 20; a catalyst supply point 15; a catalyst feeder drive 30; and a heat exchange system 38. The heat exchange system 38 may include one or more of tubes, coils, sheets, jacketing, and insulation. The tubes, coils, or sheets may have a cross-section of any shape, for example, circular, rectangular, trapezoid, or oval. Any conventional catalyst feed system may be improved as shown in the present disclosure.

The catalyst supply point 15 is connected to the catalyst feed vessel 5 and serves to supply the catalyst feed system with catalyst. The catalyst feed vessel 5 includes at least a catalyst feeder 20. In some embodiments, a catalyst hold tank 10 is operatively connected to the catalyst feeder 20, and may deliver catalyst to the catalyst feeder 20. The catalyst feeder 20 is, in turn, connected to the catalyst feeder drive 30, and serves to aliquot a measure of catalyst into the catalyst feeder drive 30. The catalyst feeder drive 30 is fluidly connected to the polymerization reactor (not shown) and serves to dispense catalyst intermittently into the polymerization reactor. Various control valves (not shown) may also serve to maintain low level continuous flow of the catalyst to the reactor. For example, where the catalyst feed vessel 5 includes a catalyst hold tank 10, a feed control valve may be used to effect the transfer of catalyst from the catalyst hold tank 10 to the catalyst feeder 20. Another feed control valve may be used to effect the transfer of catalyst from the catalyst feeder 20 to the catalyst feed drive 30.

The catalyst feed systems also includes a cooling system for temperature regulation of the catalyst feed vessels, including the catalyst feed vessel 5. The cooling system may include a heat exchange system 38 and/or 43, which may be wrapped around the catalyst feed vessel 5, (i.e., vessel tracing), for example. Where the catalyst feed vessel 5 includes a catalyst hold tank 10, either the catalyst hold tank 10 or the catalyst feeder 20 may be traced by the heat exchange system. Alternatively, both the catalyst hold tank 10 and the catalyst feeder 20 may be traced by the heat exchange system 38 and/or 43. The heat exchange systems 38 and 43 serve to cool and maintain the temperature of the catalyst feed system below a critical flow temperature by circulating cooling medium to remove heat from the catalyst feed vessel 5 via conduction.

As illustrated, the vessel tracing is not included on the removable portion between catalyst hold tank 10 and catalyst feeder 20. This tracing may be excluded for reasons such as ease of maintenance and vessel cleaning, for example. In other embodiments, this portion may be traced, insulated, or jacketed so as to decrease heat gain experienced by the catalyst during transport from catalyst hold tank 10 to catalyst feeder 20.

The cooling system disclosed herein may also include cooling conduits 35, 40, and 45, and optionally a chiller 25. The cooling system may be closed loop or single pass. A closed loop system may provide economic and environmental advantages, as it allows for the recycle and reuse of the cooling medium.

The chiller 25 may be any of those known in the art. In some embodiments of the present disclosure, the chiller system 25 may be a vent recovery chiller, a vortex cooler, or alternatively, a stand alone chiller. These different types of chiller systems may be chosen for a particular embodiment based on the availability of cooling medium, the heat load of the particular catalyst feed system, or due to cost considerations.

The chiller 25 provides cooling medium to cool the catalyst feed vessels of the present disclosure. The chiller 25 is connected to the catalyst feeder 20 by cooling conduit 35. The cooling medium is cooled by the chiller 25 and is then pumped from the chiller 25 through the cooling conduit 35. The cooling conduit 35 may be made of any material suitable for transporting the cooling medium without heat gain before the contact with the catalyst feeder 20. The cooling conduit 35 may be made of materials commonly used in flow lines, such as copper or stainless steel, and may be insulated to prevent ambient heat gain from the surroundings. The cooling conduit 35 may alternatively be made of an insulating material such as PVC or some other polymeric material.

The cooling conduit 35 supplies cooling medium to heat exchange systems 38 and 43, which serve to cool the catalyst feed vessels (catalyst feed vessel 10 and catalyst feeder 20) by indirect heat exchange. The cooling medium, as illustrated, is routed through the cooling conduit 35 to the bottom of the catalyst feeder 20. In other embodiments, the tracing may be top down.

The cooling medium is then routed through heat exchange systems 38, 43, which may wrap around the catalyst feed vessels. In some embodiments, the heat exchange systems 38, 43 may each be a single continuous coil. In other embodiments, the heat exchange systems 38, 43 may include multiple coils fed from conduits 35, 40, respectively, the coils wrapping around the catalyst feed vessels. The catalyst feed vessels and the heat exchange systems 38, 43 should be made of material which encourages heat transfer. In some embodiments, the catalyst feed vessels may be made of steel, stainless steel or other metal alloys that allow for efficient heat transfer. In some embodiments, the heat exchange systems 38, 43 are made of steel or stainless steel, and in other embodiments, the heat exchange systems 38, 43 are made of copper. Material selection may also be made based upon the corrosivity of the catalyst and/or cooling medium.

In some embodiments, the heat exchange systems 38, 43 may have a diameter of 3/8 inch. In other embodiments, the heat exchange systems 38, 43 may have a diameter of 1/4 inch, 1/2 inch, or any other commercially available size of pipe. Those of skill in the art would appreciate that the heat exchange systems 38, 43 may have any diameter, but should ensure that the resulting pressure drop is acceptable.

The heat exchange systems 38, 43 may be wrapped around the catalyst feed vessels 10, 20 in any manner which allows sufficient heat transfer from the catalyst feed vessels to the heat exchange systems 38, 43. In some embodiments, the heat exchange systems 38, 43 may be wrapped around the catalyst feed vessels in a corkscrew configuration, as shown. In other embodiments, the heat exchange systems 38, 43 may run vertically up and down the length of the catalyst feeder 20, such as in U-shaped configurations around the exterior walls of the catalyst feeder. Those of ordinary skill in the art will appreciate that the exact configuration of the heat exchange systems is not essential, and any configuration known to achieve the desired heat transfer may be used in embodiments of this disclosure.

As the cooling medium travels through the heat exchange systems 38, 43 around the catalyst feed vessels 10, 20, the cooling medium may gain heat by conduction, radiation, or convection from the catalyst feed vessels and the surroundings. In some embodiments, heat transfer cement may be applied to the heat exchange systems and the catalyst feed vessels 10, 20 to adequately distribute the cooling effect. Any heat transfer cement known in the art may be used, such as, for example, THERMON T-85, available from Thermon Manufacturing Co.

The heat gain by the cooling medium is accompanied by a concomitant heat loss from the catalyst feeder 20. The catalyst feeder 20 and the heat exchange systems 38 may be insulated to prevent unwanted heat gain from the atmosphere or from nearby equipment. Insulation of the catalyst feed vessels and cooling coils ensures that the majority of the heat gain by the cooling medium originates from the catalyst feed system, thereby ensuring efficiency of the cooling system. The catalyst feed vessels should be able to withstand the lower temperatures and any moisture generated by the cooling system. Additionally, any paint or coatings used in or on the catalyst feed vessels should be able to withstand these low temperatures and condensation in order to prevent corrosion.

Various vents and drain valves may be provided for safety, maintenance and operation of the cooling system. For example, cooling conduit 45 may be connected to breakout fittings and to a vent valve 50 to the atmosphere. Other valves, such as 41, 55, and others, may also be used.

In embodiments where a closed loop cooling system is used, the cooling medium then travels back to the chiller 25 via conduit 53. In some embodiments, where the chiller 25 is a vent recovery system, the cooling medium in conduit 45 may be routed to a vent recovery system glycol/water tank. In other embodiments, where chiller 25 is a stand-alone chiller, the cooling medium in conduit 45 may be routed to the stand-alone chiller. In yet other embodiments where chiller 25 is a vortex cooler, cooling medium in conduit 45 may be routed to the vortex cooler. Additional conduits may be provided to route cooling medium used to cool other various catalyst feed system components into conduit 53, which forms the inlet stream for the chiller 25. The cooling medium may then be cooled by the chiller system, and re-circulated through the cooling system as needed. Temperature probes (not shown) may be installed on the forward conduit 35 and return cooling conduit 45 at the points where the conduit enters and leaves the catalyst feed vessel. This allows the monitoring of the temperature of the cooling system to ensure that the heat is being removed from the catalyst feed system. In other embodiments, where a single pass cooling system is used, the cooling medium may be transported via conduit 45 to a disposal vessel.

In some embodiments, only the catalyst feeder 20 is cooled. In these embodiments, the cooling conduit 40 may then be connected to the chiller 25, closing the cooling loop. Alternatively, where a single pass chiller is used, the cooling conduit 40 may be connected to a vessel for disposal of the spent cooling medium. Those of ordinary skill will appreciate the variety of configurations of the individual components of the catalyst feed systems which can be employed in the practice of the present invention.

Figure 2:
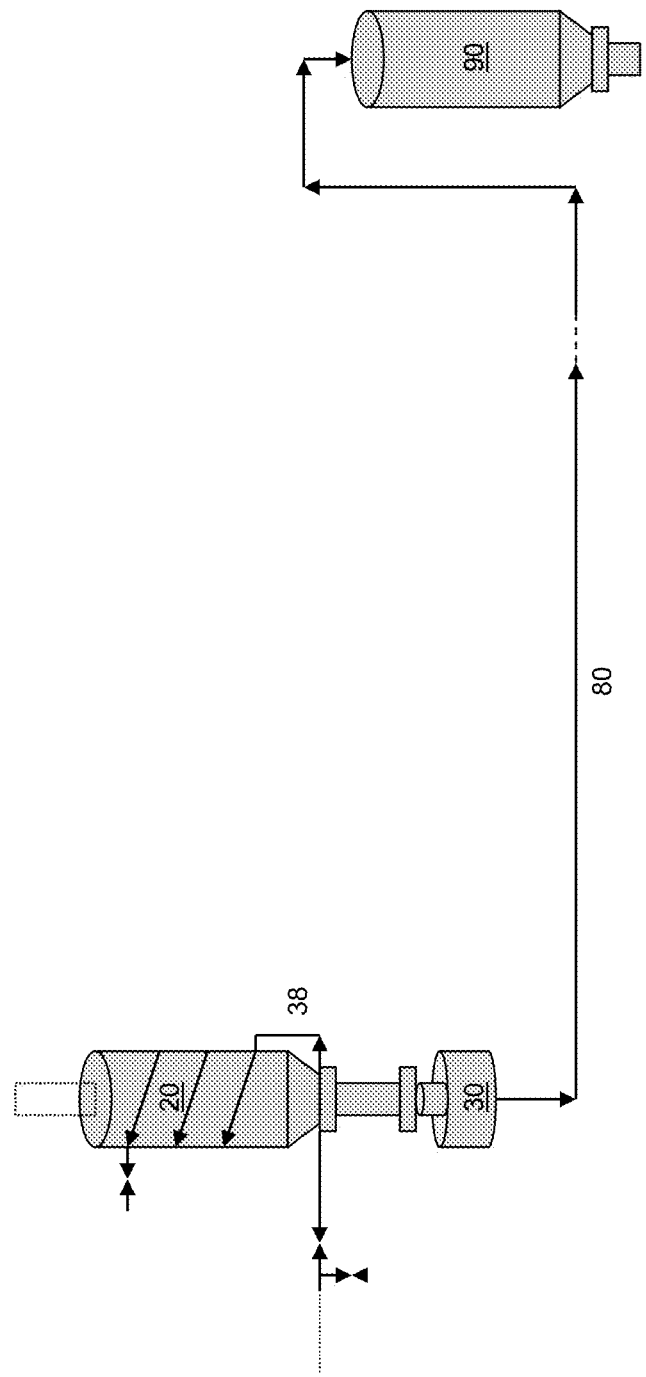
FIG. 2 is another cooled catalyst feed system, according to embodiments described herein.

Other embodiments of the improved catalyst feed system of this disclosure have major components, such as shown in FIG. 2, including: a catalyst feed vessel 10 and catalyst feed lines 80.

FIG. 2 shows catalyst feed line 80 from the catalyst feed vessel 20 to the polymerization reactor 90. The catalyst feed lines may be made of any material known to one of skill in the art. For example, the catalyst feed lines may be made of stainless steel or copper tubing. The catalyst feed vessel 20 may be of the types disclosed in FIG. 1 and described above.

In conventional polymerization systems, the catalyst feeder may be located some distance away from the polymerization reactor due to safety considerations, plant design, or retrofitting. In such cases, the catalyst may have to travel tens or hundreds of feet to arrive at the polymerization reactor. During the journey from the catalyst feed vessel to the polymerization reactor, the catalyst may be exposed to heat sources and may undergo undesirable heat gain. This heat gain may be any combination of ambient heat gain from the air surrounding the feed line, radiant heat gain from nearby machinery such as pumps, heat from the polymerization reactor 90, heat gain due to friction within the catalyst feed line 80, and so on.

The catalyst feed line 80 may be cooled to prevent the catalyst undergoing undesirable heat gain. The cooling of the catalyst feed lines 80 may be achieved by any of the means known to one of ordinary skill in the art. For example, the lines may be insulated, or encased with cooling sleeves, or traced with heat exchange systems. Cooling medium such as air, water, glycol/water mixtures and the like may be circulated through these cooling sleeves or heat exchange systems. As the catalyst passes through the catalyst feed line, any heat gain may be dissipated via the cooling medium, and thus preventing undue heat gain by the catalyst while in transit from the catalyst feed system to the polymerization reactor. Insulating the catalyst feed line also prevents undue heat gain from the surroundings by providing a non-conductive barrier layer between the catalyst and the heat sources. In embodiments where the catalyst feed system is cooled, the cooled catalyst may be maintained at a temperature below the critical flow temperature of the catalyst until delivered to the polymerization reactor 90.

In some embodiments of the present disclosure, the catalyst feed systems disclosed herein may be installed as a retrofit to a current plant infrastructure. In other embodiments, cooling systems disclosed herein may be hard built into the catalyst feed system of a new reactor. In such a case, jacketed vessels and piping may be used in lieu of tracing.

The cooling medium circulated through the heat exchange system should be able to absorb and transport heat from the catalyst feed system. Cooling medium useful in embodiments of this disclosure may be any of those known in the art such as, for example, water, glycol, a water/glycol mixture, air, other gases, liquid gases inclusive of liquid nitrogen and liquid carbon dioxide, liquid alkanes, any refrigerants, or a mixture thereof Where air is the preferred cooling medium, a vortex cooler may be used to cool and direct the compressed air. In a vortex cooler, compressed air is separated into hot and cold streams. The cold stream can be directed into the heat exchange systems to cool the catalyst feeder and catalyst feed vessel. However, vortex coolers are less efficient than chiller systems, are a source of noise pollution, use a lot of air, and air tends to have poor heat transfer. Nonetheless, vortex coolers are useful for inexpensive spot cooling in situations where compressed air is available.

In some embodiments of the present disclosure, where the cooling medium is a liquid, chiller useful in embodiments disclosed herein may be a stand-alone chiller used to cool and direct the cooling medium. The chiller may be single pass or closed circuit. The stand-alone chiller should be able to withstand harsh outdoor conditions. In some embodiments, the chiller is located above the catalyst feeder level. In these embodiments, the chilled vessels will be at a high elevation and the chilled tubing will require an anti-siphon system. In another embodiment, the chiller may be located on the same level as the catalyst feed vessel.

For an exemplary heat load of 252 Kcal/hr for the catalyst feed system (calculated under conditions of 40° C. peak summer temperature, 20 mph wind speed, 2 inch thick insulation on the catalyst feed vessels, and a desired 20° C. catalyst temperature) the smallest stand-alone chiller package available in the U.S. might be large for the heat load. Because the cooling load is low, the stand-alone chiller compressor may start and stop an unacceptable number of times. The insulation thickness may be adjusted to ensure an adequate heat load for the stand-alone chiller. Alternatively, a single pass chiller where the cooling medium is drained and not returned to the stand-alone chiller may be used.

Water is an inexpensive and widely available cooling medium and is suitable for use with a stand-alone chiller. The water may be distilled to remove minerals which may cause scaling in the heat exchange systems, or may be used without distillation. In some embodiments, water may be mixed with a chemical additive to improve flow properties or heat transfer properties. For example, water may be mixed with a glycol such as ethylene glycol. Ethylene glycol is widely used as automotive antifreeze and has a low freezing point. Mixtures of water and ethylene glycol therefore have a lower freezing point than water alone. The freezing point depends on the percentage of ethylene glycol in the mixture and may range from −1.1° C. at 5% ethylene glycol to −33° C. at 50% ethylene glycol. The chemical additive may be any of those known in the art to provide a superior cooling medium when mixed with water.

In other embodiments, cooling medium may be supplied from an existing vent recovery system, or an existing cooling system. In embodiments where a cooling medium from an existing system is used, a line may be installed from the existing system to the catalyst feed system. If sufficient head pressure is not available from the existing system to drive the cooling medium flow, a booster pump may be installed to provide the necessary pressure.

A booster pump may also be installed at the catalyst feed level to ensure adequate flow. The booster pump may be any of those known in the art. For example an air operated metal diaphragm pump such as a Wilden model PRO-FLO P-200, 1" ADVANCED™ metal Pump with WIL-FLEX diaphragms installed at the catalyst feed levels to ensure adequate flow. The air supply to the booster pump may also be adjusted by the use of a needle or globe check valve to control the flow of pump discharge or cooling medium. A check valve may also be installed on the pump discharge to prevent backflow.

The conduits and connections among the various elements of the catalyst feed system are common and well known to those skilled in the art. The diameter of the conduits may range anywhere from 12.7 mm (0.5 inch) and above. Preferably the conduits and connections have smooth, corrosion-resistant inner walls which will withstand a harsh chemical environment. In some embodiments, the conduits and connections are made of stainless steel tubing. The diameter of the catalyst supply valve openings will depend upon the diameter of the feed conduit, fill chamber of the catalyst feeder, and delivery conduit. In some embodiments, the feed conduit and delivery conduit will have a diameter ranging between about 63 mm (2.5 inch) to 25.4 mm (1.0 inch), more preferably between about 63 mm (2.5 inch) to 12.7 mm (0.5 inch). The control valves may be typical pneumatically or electrically actuated valves known to those of ordinary skill in the art. Their number and placement within the system is not critical to the practice of the present invention. Those of ordinary skill will appreciate the wide variety of control arrangements which can be employed in the practice of the present invention.

The catalyst feed system may be cooled prior to the addition of catalyst. In some embodiments, the catalyst feed system may be cooled for one day, two days, three days, four days, or more, prior to addition of catalyst to the catalyst feed system, inclusive of the catalyst feed vessels. The catalyst feed system may be continually cooled by the cooling system.

Once the catalyst feed system has been adequately cooled, the catalyst may be loaded, thus negating the need for an extensive cooling period and possible exposure of the catalyst to temperatures in excess of the critical flow temperature. The catalyst, for example, may be removed from the conditioned storage space or from the catalyst preparation/storage vessel, and loaded into the pre-cooled catalyst feed vessels.

Referring again to FIG. 1, in a class of embodiments of the present disclosure, operation of the catalyst feed system is generally a stepwise process. The catalyst is first loaded into the catalyst feed vessel 10 via the catalyst supply point 15. The catalyst supply point 15 is connected to the catalyst feed vessel 10 and serves to introduce catalyst into the catalyst feed vessel 10. The loading of the heterogeneous catalyst into the catalyst loading point 15 is usually performed under a dry and inert atmosphere to prevent any poisoning of catalyst by moisture present as humidity in the air, or by oxygen for oxygen sensitive catalysts. The catalyst flows from the catalyst supply point 15 into the cooled catalyst feed vessel 10.

The temperature of the catalyst feed vessel 10 is maintained below 29° C. In some embodiments, the catalyst feed system is maintained at a temperature lower than 25° C., lower than 20° C., lower than 15° C., lower than 10° C.

The chambers of the catalyst feed vessel 10 and catalyst feeder 20 may be configured in any way best suited to withstand the particular pressures used. Likewise, the gas used may be any gas; however, an inert gas such as nitrogen is preferred. Those of ordinary skill will appreciate that the exact configuration of the catalyst feed system is not essential; however, certain elements are of particular importance as described above.

Any ambient heat absorbed by the catalyst during loading or any heat of friction generated by loading can dissipate into the walls of the catalyst feed vessel where it may be removed by the continually flowing cooling medium. The removal of heat by the cooling medium allows the catalyst to be kept at or close to its conditioning temperature. This is advantageous where the catalyst is known to possess good flowability at its conditioning temperature. Because any heat gain is allowed to dissipate to and is removed by the cooling medium, the temperature of the catalyst may be maintained at a sufficiently low value to prevent any agglomerization of particles which may lead to clogging of feed lines and conduits. As such, the catalyst, on leaving the catalyst feed vessel 10, should possess good flowability.

The catalyst supply valve between the catalyst feed vessel 10 and the catalyst feeder 20 is opened and the pressure in the catalyst feed vessel 10 is used to promote transfer of a quantity of catalyst from the catalyst feed vessel 10, through the feed conduit and the catalyst supply valve into the cooled fill chamber of the catalyst feeder 20. In the embodiment illustrated by FIG. 1, the amount of catalyst to be delivered to the reactor is determined by the volume of the fill chamber of the catalyst feeder 20. A metering device or the like may alternatively be used to deliver a measured quantity of catalyst from the catalyst feed vessel 10 to the fill chamber of the catalyst feeder 20.

The catalyst supply valve between the catalyst feed vessel 10 and the catalyst feeder 20 is then closed and the feed control valve between the catalyst feeder 20 and the catalyst feed drive 30 is opened thereby allowing the catalyst portion within the fill chamber of the catalyst feeder 20 to flow to the reactor through feed drive 30. Because any heat gain is allowed to dissipate to and is removed by the cooling medium from the catalyst feed system, the temperature of the catalyst may be maintained below the critical flow temperature of the catalyst to prevent any agglomerization of particles in the catalyst feeder 20. Agglomerization of particles may lead to clumping of the catalyst which in turn may lead to clogging of feed lines and conduits. Because the catalyst is continually cooled, the catalyst should possess good flowability on leaving the catalyst feeder 20. Once the catalyst portion has been aliquoted to the catalyst feed line, the feed control valve is closed. The entire sequence is then repeated as necessary.

Catalyst feed systems described herein may be used for feeding catalyst in any polymerization system. Particularly, catalyst feed systems described herein may be used to maintain the catalyst within at least a portion of a catalyst feed system below a critical flow temperature of the catalyst. Such catalyst feed systems may be used with any heterogeneous catalysts or catalyst systems suitable for use in such catalyst feed systems.

For a typical commercial reactor, the heat load may be calculated based on specific site conditions. Factors to consider when calculating the heat load include solar heat flux under peak summer conditions, convective heat gain at wind velocities at the elevated structures of the polymerization system, radiant heat gain from the rector wall, and conduction through insulation. As such, the heat load of each site should be calculated to ensure adequate cooling of the catalyst feed system or portions thereof.

The cooling of the catalyst during the catalyst feed process has been observed to increase flowability. Without desiring to be bound to any single theory, it is believed that heterogeneous catalysts which may become tacky or sticky at elevated temperatures demonstrate enhanced flowability when used in catalyst feed systems as described herein.

Static generation may also an area of concern for gas phase polymerization reactions. It is known that high levels of static are deleterious to continuous operation. Static can be generated by a variety of means, including conveying of dry catalyst through the catalyst feed system. It is believed that increased static adhesion may occur in various catalyst systems at elevated temperatures. Static adhesion of catalyst particles to the various parts of the catalyst feed system or to other catalyst particles may prevent accurate delivery of specific catalyst amounts to the polymerization reactor. Without desiring to being bound to any single theory, it is believed that the use of catalyst feed systems as described herein may additionally reduce static, leading to improved flowability.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Example 1

A metallocene catalyst, XCAT™ HP-100 Metallocene Catalyst, was supplied commercially by Univation Technologies, LLC, Houston, Tex. This catalyst system could benefit from improved flowability under certain operating conditions, for example, when used in tropical climates. The catalyst cylinders were stored in a refrigerated container at 15° C. A catalyst feed system of the present disclosure was installed so as to maintain the catalyst feed vessel at a temperature below 27° C.

A thin aluminum shroud was installed around the catalyst feed vessel. Compressed air at a pressure of 7 barg was used as a heat exchange medium and was routed from an existing network to the vicinity of the catalyst feed vessel. The air supply was split into three feed lines and each was connected to an Exair CABINET COOLER™ 4840. The cold air exhaust from each Exair CABINET COOLER™ was routed with plastic hosing to exhaust into the annulus space between the catalyst feed vessel and the aluminum shroud. The three cold air feed lines were approximately 120° apart around the circumference of the catalyst feed vessel. At the top of the catalyst feed vessel, the chilled air was allowed to exit the annulus space.

The vortex coolers were operated with full air supply and an air temperature approximately 15° C. colder than the supply air temperature was achieved. Measured surface temperatures of the catalyst feed vessel ranged between 19 and 23.5° C. during the polymerization run.

No plugging of the catalyst injection tubes or the pick-up block was observed during the entire run. This was in marked contrast to prior runs without use of a cooling system.

Example 2

A metallocene catalyst, XCAT™ EZ-100 Metallocene Catalyst, was supplied commercially by Univation Technologies, LLC. This catalyst system could benefit from improved flowability under certain operating conditions, for example, when used in tropical climates.

The catalyst cylinders were stored in a refrigerated container at 10° C. A catalyst feed system of the present disclosure was installed so as to maintain the catalyst feed vessel and the catalyst feeder reservoir at a temperature below 27° C.

A chilled glycol/water flow from an existing vent recovery system was used to provide the cooling medium. A 1" line was installed from the glycol/water line of the existing vent recovery system up to the catalyst feed level. A Wilden model PRO-FLO P-200 ADVANCED™ Metal Pump was outfitted with WIL-FLEX™ diaphragms and installed at the catalyst feed level to ensure adequate flow. The pump discharge of cooling medium was routed to the base of the catalyst feeder. The cooling medium flow was split into three flow lines and routed with heat exchange systems made of copper tracing the catalyst feeder. At the top of the catalyst feeder the three lines were joined back together and a vent valve to the atmosphere added to vent liquid filling the line.

The line from the catalyst feeder was then split into three flow lines and routed with heat exchange systems made of copper from the base of the catalyst feed vessel up and around the catalyst feed vessel. At the top of the catalyst feed vessel the three lines were joined back together and a vent valve to the atmosphere added to vent while liquid filling the line.

From the top of the catalyst feed vessel, the return line was routed back to the vent recovery system glycol/water tank. The 1" line, the catalyst feed vessel, and the catalyst feeder were all insulated.

The temperature of the glycol/water at the bottom of the catalyst feeder was cold enough to form ice. The temperature of the return line from the catalyst feed vessel varied from −5 to −15° C. during the polymerization run.

No plugging of the catalyst injection tubes or the pick-up block was observed during the entire run. This was in contrast to prior runs without use of the cooling system.

Advantageously, embodiments disclosed herein may provide for improved catalyst flow from a catalyst feed vessel to a polymerization reactor. The improvements in catalyst flow may prevent or decrease the occurrence of plugging, inconsistent flow, and other issues related to poor catalyst flowability. By maintaining the catalyst feed vessel and/or catalyst feed lines below a critical flow temperature of the catalyst, polymerization operations may be improved, resulting in improved productivity and decreased reactor down time, among other benefits.

Further, the catalyst system flow through embodiments of the catalyst feed systems disclosed herein may be monitored by instruments which measure the pressure differential across a catalyst pick-up block. Catalyst system flow through some catalyst feed systems of the present disclosure, where the catalyst feed systems are maintained at a temperature less than the critical flow temperature, may advantageously demonstrate a pressure differential greater than that measured for catalyst system flow through catalyst feed systems not maintained at a temperature less than the critical flow temperature. This greater pressure differential may be indicative of an improved flowability of catalyst systems through catalyst feed systems maintained at a temperature less than the critical flow temperature. Even further, catalyst system flow through embodiments disclosed herein, where the catalyst feed systems are maintained at a temperature less than the critical flow temperature, may demonstrate long-term, predictable, greater pressure differential when compared with that measured for long-term catalyst flow through catalyst feed systems not maintained at a temperature less than the critical flow temperature. Accordingly, embodiments disclosed herein may provide for enhanced continuity of operations.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A catalyst feed system for the polymerization of olefins comprising:
 a catalyst feed vessel; and
 a heat exchange system for maintaining a temperature of a catalyst system within the catalyst feed vessel, wherein the catalyst feed vessel is jacketed, the heat exchange system comprising fluid connections for supplying a cooling medium to the vessel jacket and wherein the cooling medium is at least one of air, liquid nitrogen, liquid carbon dioxide, glycol, water, liquid alkanes, refrigerants and a mixture thereof.

2. The catalyst feed system of claim 1, wherein the heat exchange system traces the catalyst feed vessel.

3. The catalyst feed system of claim 1, further comprising a chiller for maintaining a temperature of a cooling medium supplied to the heat exchange system.

4. The catalyst feed system of claim 1, further comprising a heat exchange system for maintaining a temperature of catalyst within a catalyst feed line fluidly connecting the catalyst feed vessel and a polymerization reactor.

5. The catalyst feed system of claim 1, further comprising insulation over at least a portion of the catalyst feed vessel and heat exchange system.

6. The catalyst feed system of claim 1, further comprising at least one instrument for monitoring flowability.

7. The catalyst feed system of claim 1, wherein the heat exchange system maintains the temperature of the catalyst feed system at a temperature of 27° C. or less.

* * * * *